United States Patent
Hagerty

(10) Patent No.: US 9,108,867 B2
(45) Date of Patent: Aug. 18, 2015

(54) IMMOBILIZATION OF TECHNETIUM BY ELECTROLESS PLATING

(71) Applicant: AREVA Inc.

(72) Inventor: Kevin J. Hagerty, Richland, WA (US)

(73) Assignee: AREVA Inc., Lynchburg, VA (US)

( * ) Notice: Subject to any disclaimer, the term of this patent is extended or adjusted under 35 U.S.C. 154(b) by 95 days.

(21) Appl. No.: 13/964,247

(22) Filed: Aug. 12, 2013

(65) Prior Publication Data

US 2014/0058183 A1    Feb. 27, 2014

Related U.S. Application Data

(60) Provisional application No. 61/692,020, filed on Aug. 22, 2012.

(51) Int. Cl.
    *C23C 18/54*          (2006.01)
    *C02F 1/469*         (2006.01)
    (Continued)

(52) U.S. Cl.
    CPC ........... *C02F 1/4693* (2013.01); *C23C 18/1651* (2013.01); *C23C 18/1683* (2013.01); *C23C 18/50* (2013.01); *C23C 18/54* (2013.01);
    (Continued)

(58) Field of Classification Search
    CPC ...... C23C 18/1683; C23C 18/50; C23C 18/54
    See application file for complete search history.

(56) References Cited

U.S. PATENT DOCUMENTS

| | | |
|---|---|---|
| 3,374,157 A | 3/1968 | Box |
| 3,890,244 A | 6/1975 | Carlin |

(Continued)

FOREIGN PATENT DOCUMENTS

EP      0025847 A1    4/1981

OTHER PUBLICATIONS

PCT/US2013/055823 International Preliminary Report on Patentability issued by the International Bureau on Mar. 5, 2015.

(Continued)

*Primary Examiner* — Dah-Wei D Yuan
*Assistant Examiner* — Nga Leung V Law
(74) *Attorney, Agent, or Firm* — Sean P. O'Hanlon, Esq., PLLC

(57) ABSTRACT

A process of incorporating technetium into an electroless deposit, forming an alloy that is extremely resistant to corrosion and reduces the mobility of technetium on a geologic time scale is disclosed and claimed. The process includes providing a liquid containing technetium, such as an aqueous waste stream generated during the used nuclear fuel reprocessing activities. The technetium is collected and concentrated, and provided into an electroless deposition bath. A substrate, such as suitably prepared zero valent iron or stainless steel, is introduced into the bath to initiate autocatalytic electroless deposition of the technetium onto the substrate due to the difference in electrochemical potential between the plating bath and the metals in solution. This causes a layer of technetium metal to form on the substrate. The electroless deposition is continued until virtually all of the technetium has been removed from the bath, and then continues to build a layer of technetium-free material on the outermost surface of the substrate. One or more additional deposition steps may be performed to armor the plated substrate against leaching/corrosion in a nuclear waste disposal facility.

20 Claims, 8 Drawing Sheets

(51) Int. Cl.
  *G21F 9/06* (2006.01)
  *G21F 9/30* (2006.01)
  *G21F 9/34* (2006.01)
  *C23C 18/16* (2006.01)
  *C23C 18/50* (2006.01)

(52) U.S. Cl.
  CPC  *G21F9/06* (2013.01); *G21F 9/301* (2013.01); *G21F 9/302* (2013.01); *G21F 9/34* (2013.01)

(56) References Cited

U.S. PATENT DOCUMENTS

| | | |
|---|---|---|
| 3,922,231 A | 11/1975 | Carlin |
| 4,544,499 A | 10/1985 | Macedo |
| 5,826,163 A | 10/1998 | Saraceno |
| 6,179,981 B1 * | 1/2001 | Masson et al. .......... 205/43 |
| 6,676,988 B2 * | 1/2004 | Chan et al. .......... 427/2.24 |
| 6,776,837 B2 | 8/2004 | Wagh |
| 6,908,504 B2 | 6/2005 | Chebiam |
| 7,041,819 B2 | 5/2006 | Sessler |
| 2002/0115566 A1 | 8/2002 | Sessler |
| 2003/0113576 A1 | 6/2003 | Chebiam et al. |
| 2003/0157012 A1 | 8/2003 | Pope |

OTHER PUBLICATIONS

PCT/US2013/055823 International Search Report Feb. 27, 2014.
PCT/US2013/055823 Written Opinion of the International Searching Authority Feb. 22, 2015.

* cited by examiner

IMMOBILIZATION OF TECHNETIUM BY ELECTROLESS PLATING

CROSS-REFERENCE TO RELATED APPLICATIONS

This patent application claims the benefit of U.S. Provisional Patent Application No. 61/692,020 filed on Aug. 22, 2012, which is incorporated herein by reference in its entirety.

BACKGROUND OF THE INVENTION

1. Field of the Invention

The present invention relates to conversion of technetium that is present in aqueous nuclear waste to a less mobile and soluble form to meet long-term disposal requirements.

2. Description of the Related Art

Technetium (Tc) is a man-made element that is generated from the fission of $^{235}$U-enriched nuclear fuel in nuclear power reactors. The most abundant technetium isotope in the radioactive wastes generated during the used nuclear fuel reprocessing activities, $^{99}$Tc, has a high fission yield (approximately 6% of total fission products) and a long half-life (213,000 years). Large amounts of $^{99}$Tc typically are stored on-site at various reprocessing locations, awaiting retrieval, processing, and permanent disposal.

Technetium has an inherent high level of reactivity in the presence of oxygen, and forms the extremely soluble and mobile pertechnetate anion. Consequently, it is difficult to immobilize into a final waste form for geologic disposal, creating a potential human health risk when present in the environment. Additionally, technetium compounds are volatile in thermal processes used for processing radioactive waste, such as vitrification, resulting in high levels of $^{99}$Tc in secondary waste streams.

Among the numerous valence states of technetium, two are predominant at standard conditions: Tc(IV) and Tc(VII), with Tc(IV) compounds (such as $TcO_2$) being far less soluble than Tc(VII) compounds (such as $NaTcO_4$). Proposed waste forms that incorporate $^{99}$Tc into their structure attempt to take advantage of this fact by utilizing reducing agents to form the less soluble Tc(IV) and prevent re-oxidation to the more soluble species. These getters include goethite, tin apatite, and zero valent iron. Waste forms investigated for $^{99}$Tc incorporation include Fluidized Bed Steam Reforming (FBSR), cast stone, ceramacrete, geopolymer, ion exchange resins, and others. These methods have had varying success, however, in demonstrating sufficient retention capabilities for $^{99}$Tc to prevent the mobile $^{99}$Tc from being released from the waste forms and migrating to the environment. Any waste form containing $^{99}$Tc must meet a rigorous testing program to comply with waste acceptance criteria at nuclear waste disposal facilities.

What is needed is a reliable way to safely convert technetium to a less mobile and less soluble form for long-term disposal.

SUMMARY OF THE INVENTION

This invention provides a process of incorporating $^{99}$Tc into an electroless plating deposit, forming an alloy that is extremely resistant to corrosion and prevents the mobility of $^{99}$Tc. The process includes treating a liquid containing $^{99}$Tc, such as an aqueous waste stream generated during the used nuclear fuel reprocessing activities. This liquid is filtered, if desired, to remove unwanted particulates, and the $^{99}$Tc is adsorbed from the liquid via a pertechnetate specific ion exchange resin. The adsorbed $^{99}$Tc is then eluted from ion exchange media, collected as a concentrated solution, and fed into an electroless plating bath containing another transition metal, which may be nickel or cobalt; a reducing agent which may be hypophosphite ion, borohydride ion, sulfite or metabisulfite ion, dimethylamine borane, or hydrazine; and a carboxylic or aminocarboxilic acid complexant. Alternatively, an aqueous liquid stream containing technetium as pertechnetate may be treated directly, without concentration, if desired. A catalytically active substrate, such as suitably treated zero valent iron, stainless steel, sensitized and activated glass, or other substrate that has been suitably activated is introduced into the properly prepared electroless plating bath. This initiates autocatalytic electroless deposition of the dissolved transition metals that are present in the plating bath solution (which includes $^{99}$Tc) onto the substrate due to the difference in electrochemical potential between the bath chemicals and the metals in solution, causing a layer of deposition material to form on the substrate. The electroless deposition continues as long as the substrate is maintained in the plating bath and plating chemicals are replenished as they are consumed, until substantially all of the $^{99}$Tc is removed from the bath and deposited onto the substrate. Maintaining the substrate within the bath after this time will continue to grow the deposition layer on the substrate. In this manner, the $^{99}$Tc will be encased within the resultant layered substrate away from its surface.

If desired, the plated substrate may be subjected to subsequent electroless depositions. Such subsequent depositions are optional, but may be included to ensure the $^{99}$Tc is fully immobilized and to ensure its stability for long-term disposal. One or more of these optional steps may include high phosphorus electroless nickel, palladium, and/or gold armoring depositions.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
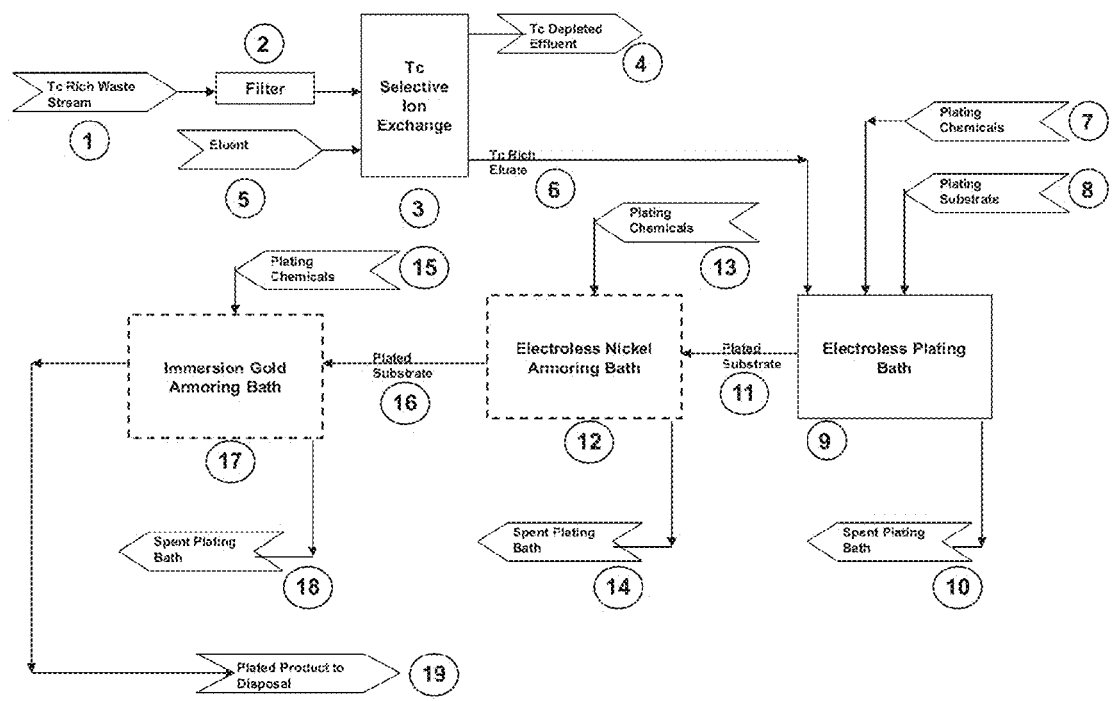
FIG. 1 shows a flowchart of a preferred process for technetium plating according to the present invention.

The disclosed electroless technetium plating process is a new concept wherein $^{99}$Tc is incorporated into a metallic electroless plating deposit, forming an alloy that is extremely resistant to corrosion, and reduces the mobility of $^{99}$Tc due to re-oxidation.

Electroless plating is the autocatalytic reduction of certain soluble transition metal salts to their metallic, zero valent forms in the presence of appropriate reducing agents. Electroless deposition occurs when the oxidation potential of the reducing agent is less noble than the deposition potential of the metal. Due to its simplicity, flexibility, and capability to form adherent and corrosion resistant metal films, electroless plating techniques are in common use worldwide. Most common among the elements utilized in electroless processes are nickel and cobalt, but this group can also include copper, gold, silver, and platinum group metals (such as rhodium, palladium, and platinum). For practical purposes, only nickel and cobalt need to be considered here. In this process, appropriate reducing agents, such as hypophosphite ion, borohydride sulfite or metabisulfite dimethylamine borane, or hydrazine, soluble transition metal salts such as nickel sulfamate, nickel sulfate, nickel chloride, or similar cobalt compounds, and mono- or polycarboxylic acid or salt thereof such as sodium citrate or polyaminocarboxylates such as diethylene triamine pentaacetic acid or pyrophosphate as a complexing ligand are combined to form a "plating bath." It should be noted that the complexing ligand is used to maintain solubility of the nickel or cobalt, as the solubility of these compounds is extremely limited at the desired plating conditions.

Technetium does not form a complex with mono- or polycarboxylic or polyaminocarboxylic acids or salts; rather, it is maintained in solution at the proper valence by virtue of the plating bath Eh and pH. Once suitably activated, components to be plated are then introduced to the bath where the target metal(s) deposit spontaneously onto the surface. This autocatalytic plating continues until the components are removed from the bath.

Due to its nature, technetium cannot be autocatalytically plated alone in a plating bath, but can be shifted to a nobler potential in the presence of another transition metal such as nickel or cobalt. Although the exact mechanism is not know, the process may proceed by virtue of nickel or cobalt being reduced by the reducing agent and depositing onto the substrate in the metallic state, and is then subsequently oxidized in turn by technetium in solution, forming metallic technetium on the substrate surface. This is an important aspect of the process, as oxidized forms of technetium, namely technetium heptoxide, technetium dioxide, and pertechnetates are volatile at elevated temperatures. One potential final waste form for the plated technetium may be vitrification, which has a history of volatizing technetium, thereby reducing its incorporation into the molten glass.

In a preferred embodiment, nickel is the primary transition metal, due to convenience and ready availability. The nickel provides the in-situ autocatalytic effect for the reduction of technetium, forming a Ni—P-99Tc ternary alloy.

In order to electrolessly plate technetium, the oxidation state must be maintained in the pertechnetate form. Otherwise, the formation of undesirable technetium dioxide takes place, and technetium is not completely removed from the system. Technetium dioxide cannot be reduced and deposited by electroless means. The method used to maintain the pertechnetate form of technetium is to control the pH and Eh within a certain range of conditions, as noted in FIG. 4. Within this range of conditions, technetium is maintained in the pertechnetate form, and electroless plating proceeds as desired. The electrochemical reactions are:

Electrochemical Potential, E°

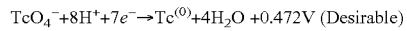

$$TcO_4^- + 8H^+ + 7e^- \rightarrow Tc^{(0)} + 4H_2O \ +0.472V \text{ (Desirable)} \quad \text{Eq. 1}$$

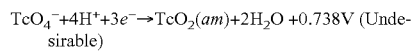

$$TcO_4^- + 4H^+ + 3e^- \rightarrow TcO_2(am) + 2H_2O \ +0.738V \text{ (Undesirable)} \quad \text{Eq. 2}$$

The inventive electroless technetium plating process is a new concept wherein $^{99}Tc$ is incorporated into an electroless plating deposit, forming an alloy that is extremely resistant to corrosion, and reduces the mobility of $^{99}Tc$ due to re-oxidation.

Overall Reactions

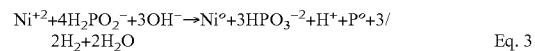

$$Ni^{+2} + 4H_2PO_2^- + 3OH^- \rightarrow Ni^\circ + 3HPO_3^{-2} + H^+ + P^\circ + 3/2H_2 + 2H_2O \quad \text{Eq. 3}$$

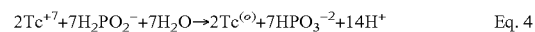

$$2Tc^{+7} + 7H_2PO_2^- + 7H_2O \rightarrow 2Tc^{(o)} + 7HPO_3^{-2} + 14H^+ \quad \text{Eq. 4}$$

Figure 2:
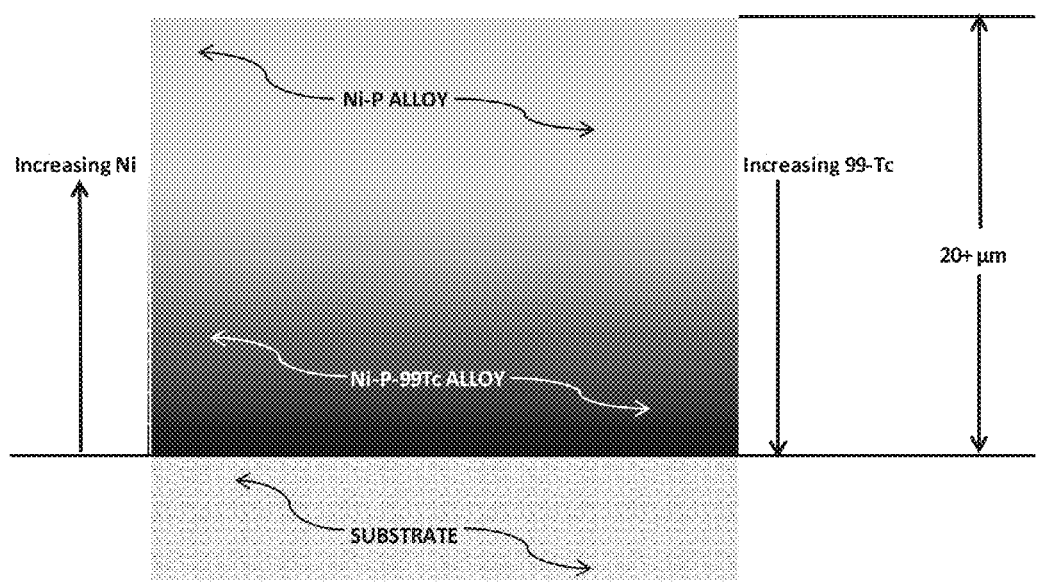
FIG. 2 shows a representation of plated deposit indicating preferential $^{99}$Tc deposition.
Figure 3:
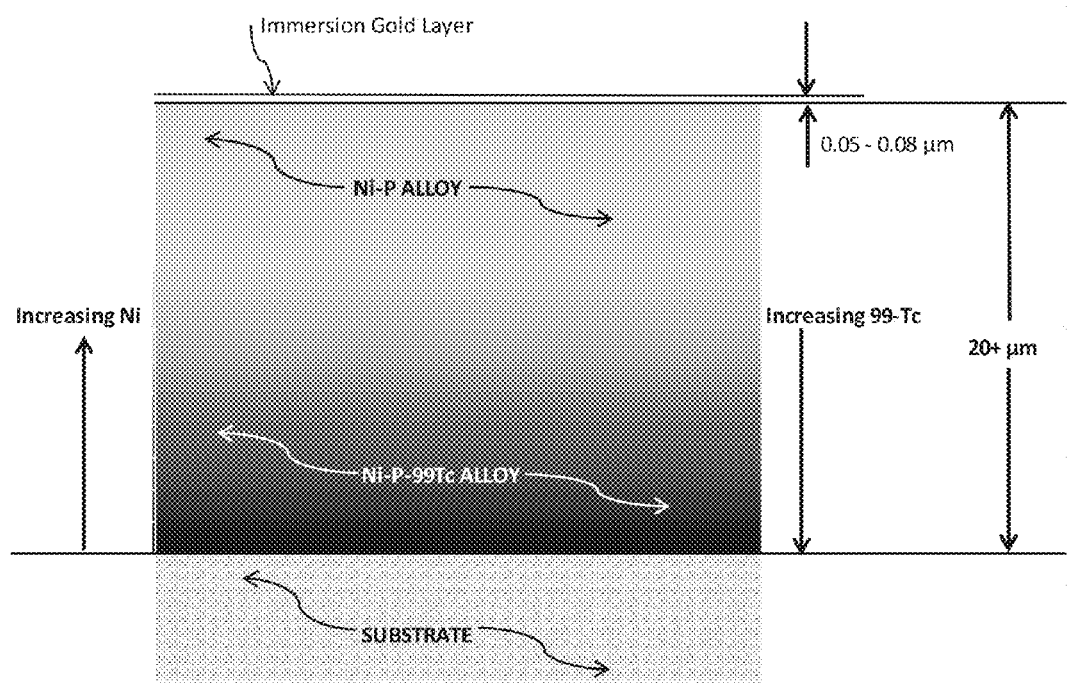
FIG. 3 shows a representation of the layered substrate of FIG. 2 after being subjected to immersion gold deposit.

The resultant electroless deposit will contain nickel, technetium, and phosphorous. A typical high phosphorous deposit will contain approximately 10% phosphorous, which enhances the resistance to corrosion. Electroless plating onto the chosen substrate continues autocatalytically until a predetermined decontamination factor (DF) in the bath is achieved. The composition of the deposit proceeds gradually from a Ni—P—$^{99}Tc$ alloy to a Ni—P alloy as technetium in the bath is consumed (FIG. 2). Plating continues until an adequate Ni—P armoring layer has been plated over the ternary Ni—P—$^{99}Tc$ layer. Typical plated film thickness is on the order of 20 μm; however, deposit thickness is dictated by length of time in the bath.

The following examples will illustrate the effectiveness of the electroless technetium plating process, as well as outline the preferred operational parameters. Bath components and parameters are located in Table 1.

Example 1

In this example, a solution of technetium is plated onto a suitably pretreated granular iron substrate, with no bath pH adjustment during the plating process. Bath components and parameters are indicated in Table 1. For this test, the quadridentate ligand citrate is used as a complexant. Plating ensued for 30 minutes to produce a technetium deposit on the substrate. In this test, the pH was allowed to drop naturally as caused by the reduction of metal ions to their metallic state, producing acids as indicated in equations 3 and 4. No alkali was added to maintain pH, resulting in a pH of <9 after about 5 minutes plating duration. The pH dropped below that as required by FIG. 4, resulting in cessation of technetium plating, and serves to illustrate the need to maintain the required plating parameters. Results are plotted in FIG. 5.

TABLE 1

| | Plating components and parameters | | | | | |
|---|---|---|---|---|---|---|
| Ex. | Nickel (M) | Hypophosphite (M) | Citrate (M) | Substrate | Temp. (° C.) | Initial pH |
| 1 | 3.80E−04 | 4.60E−03 | 0.17 | Iron | 80-90 | 11.5 |
| 2 | 3.80E−04 | 4.60E−03 | 0.33 | Iron | 80-90 | 12.5 |
| 3 | 3.80E−04 | 4.60E−03 | 0.33 | SST | 80-90 | 12.5 |
| 4 | 3.80E−04 | 4.60E−03 | 0.33 | SST | 80-90 | 12.5 |

Example 2

Figure 4:
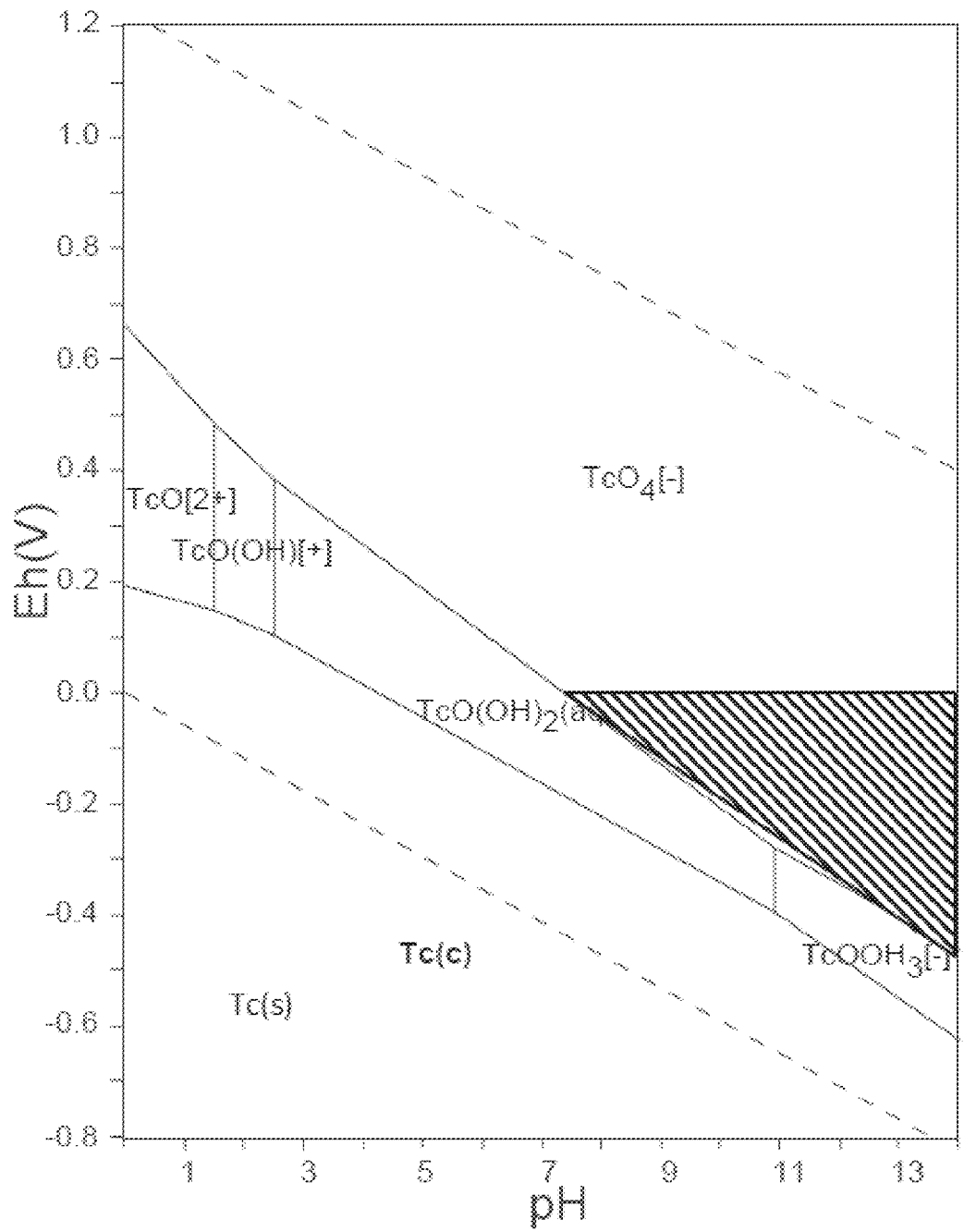
FIG. 4 shows the active electroless technetium plating zone superimposed on the technetium Eh-pH (Pourbaix) diagram.
Figure 5:
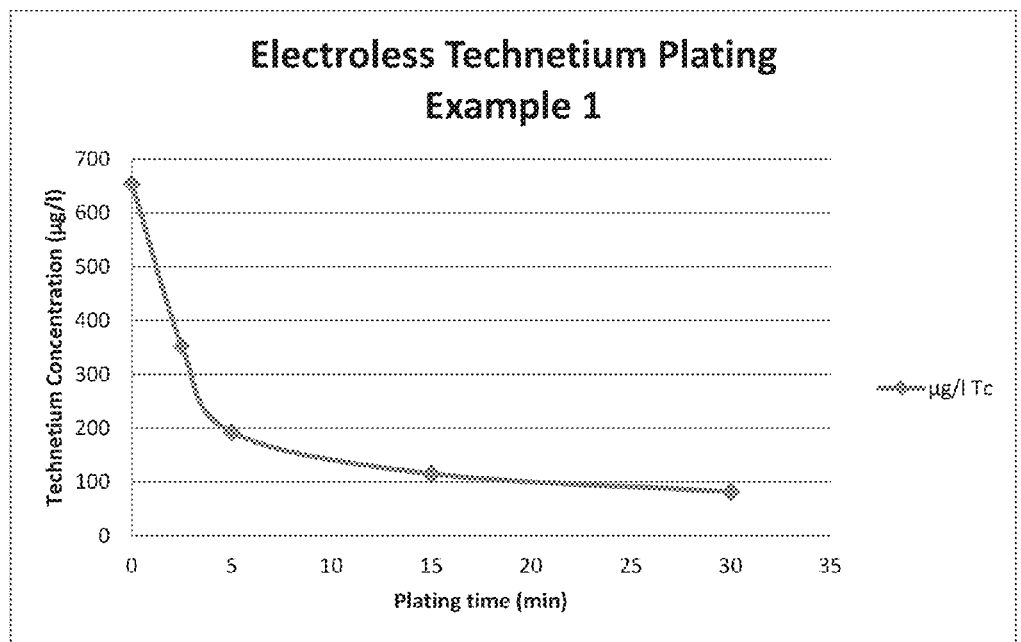
FIG. 5 shows results from a first example of the present invention.

This example utilizes the addition of alkali in the form of sodium hydroxide to maintain pH in the proper range, periodic additions of nickel and hypophosphite to maintain bath chemistry, and suitably pretreated granular iron as a substrate. A higher pH is utilized in order for plating parameters to be centrally located in the technetium plating zone (FIG. 4).

Figure 6:
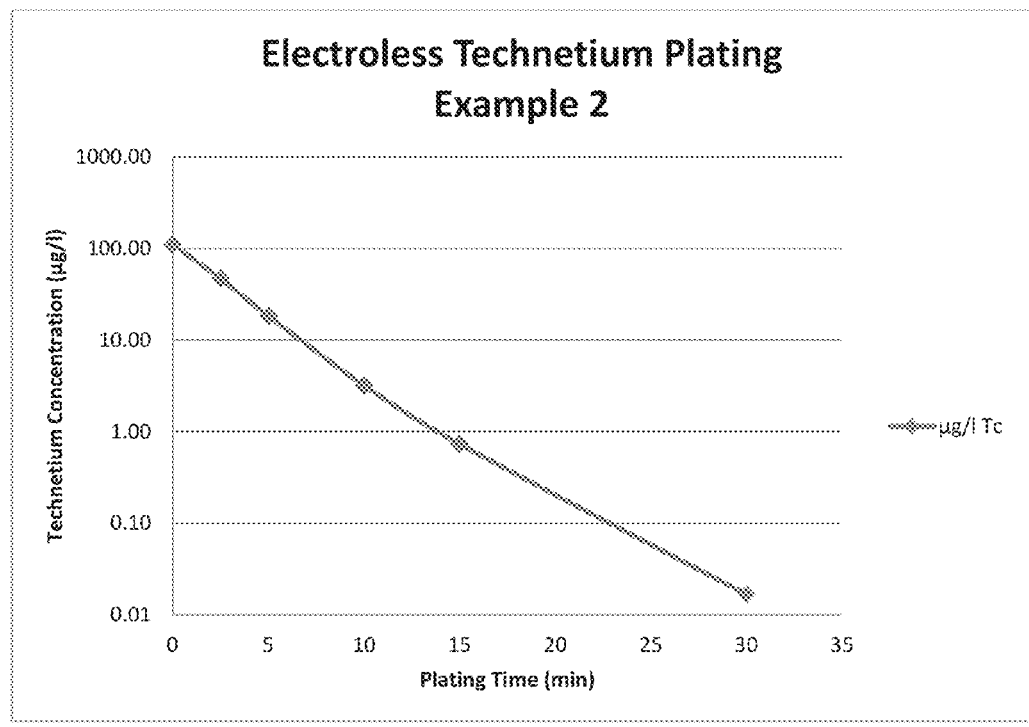
FIG. 6 shows results from a second example of the present invention.
Figure 7:
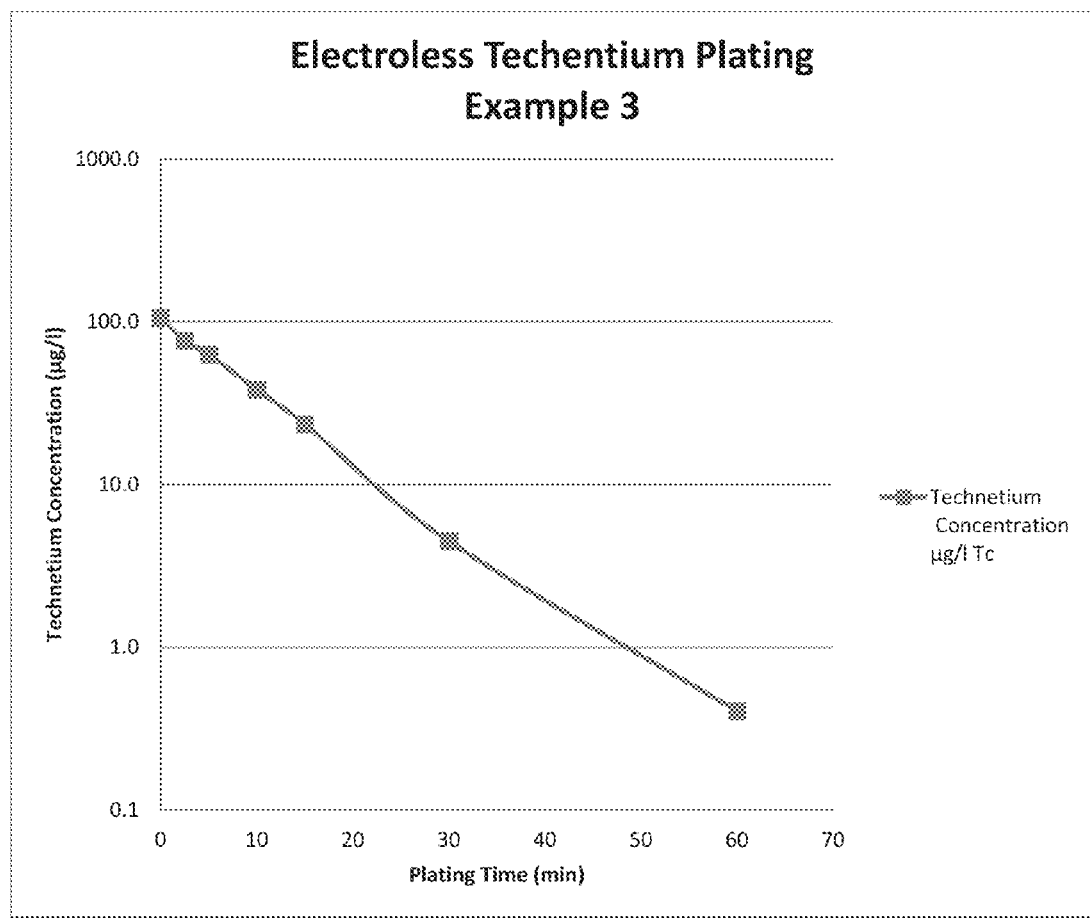
FIG. 7 shows results from a third example of the present invention.

Ligand concentration was increased to prevent the formation of nickel hydroxides. This test indicates that the removal of technetium is logarithmic in nature, as is evidenced by the linearity of the data shown in FIG. 6. In this test, technetium was removed from the aqueous stream to a level less than the Environmental Protection Agency Drinking Water Standard of 900 pCi/l (equivalent to 0.053 µg/l). The process is capable of further reduction in the technetium concentration, however, lower levels of technetium are below the Minimum Detectable Activity of the analysis instrument.

Example 3

This example repeats example 2, but utilizes suitably prepared stainless steel substrate spheres. Technetium is reduced in a similar fashion, however, the plating rate is less due to a smaller available substrate surface area relative to the previous test. This test serves to illustrate the flexibility of the process in utilizing a variety of plating substrates.

Example 4

Figure 8:
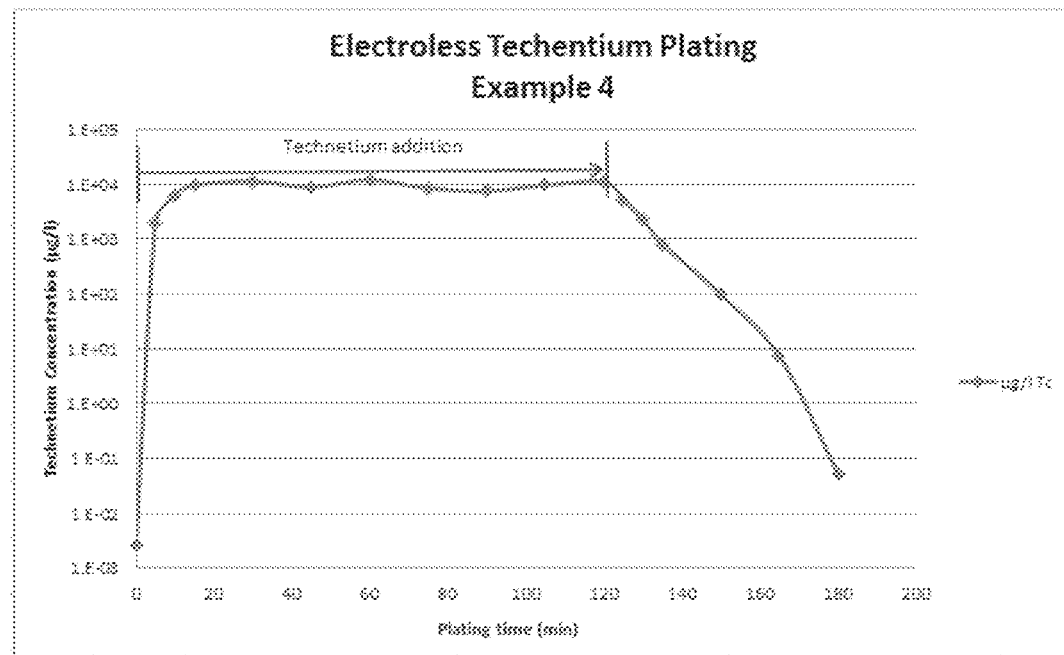
FIG. 8 shows results from a fourth example of the present invention.

This test utilizes a prototypical concentration of technetium at 500 mg/l as feedstock, and illustrates the preferred embodiment. Technetium was plated with components and parameters as indicated in Table 1. In this test, two vessels—the feed vessel and the plating vessel—are both made up with the components as noted in Table 1, the exception being the feedstock vessel contains 500 mg/l technetium. Once the desired plating conditions have been attained, the technetium is slowly fed into the electroless plating bath, suitably prepared substrate is introduced and technetium, nickel, and phosphorus are electrolessly plated onto the substrate. In this test, the technetium laden solution was fed into the plating bath for a two-hour duration. At this point, the technetium feed was stopped, and the electroless plating continued until technetium was reduced to a concentration of less than 50 parts per trillion, resulting in a Decontamination Factor greater than 10,000,000, with a final aqueous concentration below the Minimum Detectable Activity of the analytical instrument, meeting the Drinking Water Standard. Results are plotted in FIG. 8. This method of slow technetium feed into the plating vessel is needed, due the poisoning effect of the technetium on the electroless plating process, which takes place at approximately 20 mg/l. By this means, much higher concentrations of technetium can be treated without poisoning the plating process.

Preferred Process

A preferred process for technetium plating according to the present invention is illustrated in FIG. 1. This process involves the unit operations of filtration, ion exchange, and electroless plating to sequester the radioactive isotope $^{99}Tc$ into a waste form that minimizes long term leaching under any environmental conditions.

An aqueous waste stream containing trace quantities of $^{99}Tc$ in the form of pertechnetate anion 1 is first filtered 2 to remove particulates that may blind off ion exchange resin columns. Pertechnetate specific ion exchange 3 is utilized to sorb the technetium from the feed stream, and serves to concentrate the $^{99}Tc$ into a much smaller volume in relation to the influent. Effluent from the ion exchange columns 4 is then directed to downstream processing, or disposal. Warm water or other eluent 5 is used to elute the $^{99}Tc$ from the ion exchange columns, resulting in an eluate that is highly concentrated in $^{99}Tc$. The eluate serves as the make-up water to the electroless plating bath 9, to which concentrated plating chemicals 7, such as nickel sulfate, sodium hypophosphite, and complexants are added. The bath is pH adjusted to a an alkaline state, brought to operating temperature, and the plating substrate 8, such as suitably prepared zero valent iron or suitably prepared stainless steel is introduced. Once the substrate is added to the bath, the electrochemical potential difference between the substrate and the compounds of the plating bath forces the spontaneous onset of electroless plating. Technetium and nickel form a wry co-deposit with phosphorus, where technetium plates preferentially to either nickel or phosphorous. As the concentration of technetium in the bath diminishes, the concentration of nickel in the deposit increases, until essentially all of the $^{99}Tc$ is consumed. Plating continues autocatalytically until a predetermined amount of binary nickel-phosphorous alloy has been deposited onto the $^{99}Tc$ rich layer.

The plated substrate 11 may then be introduced into a second, optional, mildly acidic 13 plating bath 12 that is utilized to "armor" the plated substrate with a high phosphorous-nickel layer and/or electroless palladium layer to further enhance the corrosion characteristics of the deposit, if necessary.

A second optional armor plating step may then be utilized. An immersion gold bath 17 may be used to enhance the corrosion resistance characteristics of the deposit to the point of being resistant to oxidation or weathering on a geologic time scale. When the plated substrate 16 is introduced to the immersion gold bath 17, the gold displaces nickel (and technetium, if present, thereby decontaminating the surface) until the surface of the plated substrate is displaced with a thin, impermeable layer of gold approximately 50 to 80 nanometers thick. The immersion gold reaction is self-limiting; once all available nickel sites have reacted with the gold, the plating stops.

One or more of these optional baths may be used, depending on waste disposal criteria, and performance of the deposits against corrosion and leaching. The resulting plated product is then in its final metallic waste form, as a compact, sealed solid alloy 19. The plating bath(s) must occasionally be disposed of, as plating by-products buildup 10, 14, and 18.

FIG. 2 shows a representation of plated deposit indicating preferential $^{99}TC$ deposition. The substrate is shown at the lower portion of the figure. The first deposition layer is applied to the substrate by electroless deposition, and includes the $^{99}Tc$. As the amount of $^{99}Tc$ in the deposition bath decreases (as it is deposited on the substrate), the concentration of $^{99}Tc$ in the first layer decreases as a function of distance from the substrate surface. As the electroless deposition process continues, eventually the $^{99}Tc$ left in the bath is reduced to a concentration that is less than detectable by typical laboratory instrumentation, and, thus, no more $^{99}Tc$ will be deposited onto the substrate. Keeping, the substrate within the bath for a longer period of time will cause additional Ni—P that essentially does not contain technetium to plate onto the $^{99}Tc$ rich portion of the deposit. The result is a plated metal film that has the greatest concentration of $^{99}Tc$ near the substrate surface, and non-existent at the outermost portion. The overall thickness of the deposited layer is 10-20 µm or greater.

The resultant electroless deposit will contain nickel or cobalt depending on the primary transition metal used, technetium, and either phosphorous or boron, depending on the reductant used. A high phosphorous or boron deposit will contain approximately 10% of this element, and enhances the resistance to corrosion.

To further enhance the long term leaching and corrosion resisting capabilities of the plated waste form, an acidic (approximate pH 4.5) high phosphorous nickel bath, electroless palladium, or immersion gold or a combination of these may be used. Plating an optional thin gold layer onto the nickel surface resulting from the electroless nickel process provides an extremely corrosion resistant surface.

The inventive process beneficially incorporates highly soluble technetium into an electrolessly deposited nickel alloy, rendering the technetium immobile on a long term basis. Electroless technetium plating may provide a method to immobilize technetium that will provide satisfactory incorporation into a glass or other waste form. Processing plants typically do not have an alternate means of waste disposal, a (primary reason for the singular disposal method being the leaching of $^{99}$Tc from alternate waste forms, and subsequent release to the vadose zone of this highly mobile and long lived species.

The UREX process, which is a candidate method for used nuclear fuel reprocessing, splits uranium and technetium into a separate fraction from the remainder of fission products. The $^{99}$Tc must then be separated from the uranium in order to recycle the uranium for re-enrichment. $^{99}$Tc is removed by ion exchange, then smelted with fuel cladding hulls in a process that operates at approximately 1600° C. to form an alloy of $^{99}$Tc and stainless steel and/or zirconium. This is an intensive, time consuming process. The proposed $^{99}$Tc electroless plating is a low temperature, aqueous process that has far fewer hazards, yet accomplishes essentially a similar result by incorporating the $^{99}$Tc into a metallic alloy.

Another known method of removing $^{99}$Tc from a liquid waste stream is by using a tetraphenylphosphonium bromide (TPPB) precipitation process. The resulting flocculant from this method is incorporated into a cementicious waste form for final disposal. It has been shown that exposure to an alkaline environment, such as that found in the pores of cement, TPPB can degrade, resulting in the release of pertechnetate ion to the environment. The proposed ion exchange/electroless plating method for capturing and sequestering $^{99}$Tc may be a substantial improvement in the process.

At some spent reactor fuel processing sites, groundwater has been contaminated with $^{99}$Tc as a result of past discharges. The current method of $^{99}$Tc extraction is by way of pump and treat systems, utilizing commercially available pertechnetate specific ion exchange resin. The $^{99}$Tc laden resin is not eluted, but is instead disposed of after a single pass. This resin is very expensive. The proposed ion exchange/electroless plating me method may provide a substantial cost savings when compared to the existing method.

$^{99}$Tc is a contaminant in barrier gas diffusion tubes that were previously used in the enrichment of uranium. The form of the $^{99}$Tc is water soluble fluorine compounds, and could be rinsed off of the diffusion tubes, concentrated, and plated with the proposed ion exchange/electroless plating method.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A process, comprising:
providing a radioactive waste liquid generated during reprocessing of used nuclear fuel, said liquid containing $^{99}$Tc;
adding chemicals to said liquid to form an electroless plating bath;
introducing a plating substrate into said bath to initiate electroless deposition of said $^{99}$Tc onto said substrate; and
maintaining said substrate within said bath until substantially all of said $^{99}$Tc is removed from said bath and deposited onto said substrate.

2. The process of claim 1, further comprising:
filtering said liquid to remove unwanted particulates;
eluting Tc from said liquid; and
collecting eluted $^{99}$Tc as a concentrated solution.

3. The process of claim 2, wherein said eluting includes performing a pertechnetate specific ion exchange.

4. The process of claim 1, wherein said liquid is an aqueous solution.

5. The process of claim 1, wherein said chemicals include Ni—P and further comprising maintaining said substrate within said bath as additional Ni—P is plated, and no $^{99}$Tc is deposited onto said substrate over said $^{99}$Tc rich deposit.

6. The process of claim 1, wherein said maintaining continues until said deposit has a thickness of at least 20 µm.

7. The process of claim 1, further comprising:
providing a second plating bath;
introducing said plated substrate into said second bath to initiate a second electroless deposition onto said substrate; and
maintaining said substrate within said bath to form a second layer thereon.

8. The process of claim 7, further comprising
providing a third plating bath;
introducing said layered substrate into said third bath to initiate a third electroless deposition onto said substrate; and
maintaining said substrate within said bath to form a third layer thereon.

9. The process of claim 7, wherein said providing said second plating bath includes providing said second bath in an acidic state.

10. The process of claim 7, wherein said providing said second plating bath includes providing an immersion gold bath.

11. The process of claim 1, wherein said providing said liquid includes providing said liquid containing trace elements of $^{99}$Tc in the form of pertechnetate anion.

12. The process of claim 1, further comprising adjusting said bath to an alkaline state.

13. The process of claim 1, wherein said introducing said plating substrate includes introducing a catalytically active substrate into said bath.

14. The process of claim 1, wherein an alkaline pH is maintained within said bath.

15. The process of claim 1, wherein said chemicals and said plating substrate are chosen such that a range of electrochemical potential difference between said chemicals and said plating substrate is zero at pH 7 to −500 mV to 0 mV at pH 14.

16. The process of claim 1, further comprising maintaining nickel or cobalt in said electroless plating bath to provide an in situ reductant for $^{99}$Tc.

17. The process of claim 16, further comprising maintaining a complexant in said electroless plating bath to promote solubility of said nickel or cobalt.

18. The process of claim 1, wherein reducing conditions are maintained.

19. A process of immobilizing $^{99}$Tc in a reactive radioactive waste liquid, comprising:
   filtering said liquid to remove unwanted particulates;
   eluting $^{99}$Tc from said liquid;
   collecting eluted $^{99}$Tc as a concentrated solution;
   adding chemicals to said solution to form an electroless plating bath; and
   introducing a plating substrate into said bath to initiate electroless deposition of said $^{99}$Tc onto said substrate.

20. The process of claim 19, wherein said adding includes adding Ni—P to said solution; and further comprising:
   maintaining said substrate within said bath until substantially all of said $^{99}$Tc is removed from said bath and deposited onto said substrate; and
   further maintaining said substrate within said bath as Ni—P is plated onto said substrate to form a layered substrate, wherein said $^{99}$Tc is encased within said layered substrate away from an outer surface of said layered substrate.

\* \* \* \* \*